United States Patent
Nagatomo

(10) Patent No.: US 9,215,314 B2
(45) Date of Patent: Dec. 15, 2015

(54) VOICE INPUT SYSTEM AND INFORMATION STORAGE MEDIUM STORAGE VOICE INPUT PROGRAM

(75) Inventor: Kentaro Nagatomo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 13/516,289
(22) PCT Filed: Nov. 12, 2010
(86) PCT No.: PCT/JP2010/006666
§ 371 (c)(1),
(2), (4) Date: Jun. 15, 2012

(87) PCT Pub. No.: WO2011/074180
PCT Pub. Date: Jun. 23, 2011

(65) Prior Publication Data
US 2012/0258769 A1 Oct. 11, 2012

(30) Foreign Application Priority Data
Dec. 17, 2009 (JP) ............... 2009-286775

(51) Int. Cl.
H04W 88/02 (2009.01)
H04M 15/06 (2006.01)
H04M 3/42 (2006.01)
G06F 3/16 (2006.01)
G10L 15/30 (2013.01)
G10L 15/26 (2006.01)

(52) U.S. Cl.
CPC ...... *H04M 3/42042* (2013.01); *H04M 3/42195* (2013.01); *G06F 3/167* (2013.01); *G10L 15/26* (2013.01); *G10L 15/30* (2013.01); *H04M 2201/41* (2013.01)

(58) Field of Classification Search
CPC ...... H04L 9/32; H04M 1/271; H04M 3/4936; H04M 1/26; H04M 1/72547; H04M 1/72561; H04M 3/42042; H04M 3/42195; H04M 3/436; H04M 2201/40; H04M 2201/41; H04M 2201/74; H04W 12/00; H04W 12/06; H04W 12/08; H04W 12/10; H04W 12/12; G10L 17/00; G10L 17/005

USPC ............ 455/410–417, 550.1–553.1, 563; 379/142.01–142.07, 142.12–142.15, 379/201.01–218.02
See application file for complete search history.

(56) References Cited

U.S. PATENT DOCUMENTS

| | | | |
|---|---|---|---|
| 2003/0153364 A1* | 8/2003 | Osann, Jr. ............. | 455/567 |
| 2003/0187988 A1* | 10/2003 | Lee et al. ............. | 709/227 |
| 2003/0221125 A1* | 11/2003 | Rolfe .................... | 713/201 |
| 2004/0107108 A1* | 6/2004 | Rohwer ................. | 704/275 |
| 2005/0025127 A1* | 2/2005 | Strathmeyer .......... | 370/352 |

FOREIGN PATENT DOCUMENTS

| | | |
|---|---|---|
| JP | 2000-148677 A | 5/2000 |
| JP | 2001-268241 A | 9/2001 |
| JP | 2002-359688 A | 12/2002 |
| JP | 2003-044445 A | 2/2003 |
| JP | 2003-125109 A | 4/2003 |
| JP | 2003-186837 A | 7/2003 |
| JP | 2003-233595 A | 8/2003 |
| JP | 2005-110034 A | 4/2005 |

\* cited by examiner

*Primary Examiner* — San Htun
*Assistant Examiner* — Erica Navar
(74) *Attorney, Agent, or Firm* — Sughrue Mion, PLLC

(57) ABSTRACT

A voice input system (100) includes a processing receiving unit (104) that receives identification information of a telephone that is to receive a callback, in order to input a voice, together with a voice recognition process request, a call processing unit (106) that originates a callback based on the identification information of the telephone received by the processing receiving unit (104), a voice data receiving unit (108) that receives voice data of a voice when the callback originated by the call processing unit (106) is received and the user's voice is input, and a voice recognition result storage unit (122) that stores result data which is data of a voice recognition result of the voice data received by the voice data receiving unit (108) in association with the identification information of the telephone.

13 Claims, 16 Drawing Sheets

FIG. 2

| TELEPHONE NUMBER | TIME | RESULT DATA | VOICE DATA |
|---|---|---|---|
| 03-xxxx-xxxx | 2009/11/01 15:21 | data00x9t | data00x9v |
| 03-xxxx-xxxx | 2009/10/31 12:05 | data00x8t | data00x8v |
| 03-xxxx-xxxx | 2009/10/30 09:52 | data00x7t | data00x7v |
| 03-xxxx-xxxx | 2009/10/29 11:02 | data00x6t | data00x6v |
| ⋮ | ⋮ | ⋮ | ⋮ |
| 03-xxxx-xxx0 | 2009/10/30 08:02 | data0xx2t | data0xx2v |
| ⋮ | ⋮ | ⋮ | ⋮ |

| TEMPLATE NUMBER | TITLE | TEMPLATE TEXT | FEATURE DATA |
|---|---|---|---|
| 1 | CALLBACK REQUEST | Mr. ○○ CALLED YOU. PLEASE CALL BACK TELEPHONE NUMBER ○○○○ | 0001p |
| 2 | CALL AGAIN LATER | Mr. ○○ CALLED YOU. Mr. ○○ WILL CALL AGAIN LATER | 0002p |
| 3 | ONLY MESSAGE | | 0003p |
| ⋮ | ⋮ | ⋮ | ⋮ |

120

VOICE INPUT SYSTEM AND INFORMATION STORAGE MEDIUM STORAGE VOICE INPUT PROGRAM

CROSS REFERENCE TO RELATED APPLICATIONS

This application is a National Stage of International Application No. PCT/JP2010/006666 filed Nov. 12, 2010, claiming priority based on Japanese Patent Application No. 2009-286775, filed Dec. 17, 2009, the contents of all of which are incorporated herein by reference in their entirety.

TECHNICAL FIELD

The present invention relates to a voice input system and a voice input program.

BACKGROUND ART

In recent years, techniques have been developed to receive information by voice and convert the voice into text data using a voice recognition processing technique. Further, attempts to input a voice by phone and then perform a voice recognition process have been made.

Patent Document 1 (Japanese Patent Application Laid-Open No. 2001-268241) discloses a wireless mobile terminal communication system that includes a wireless mobile terminal and a center. The wireless mobile terminal includes a microphone, a speaker, a display screen, and a key operation unit and has a voice communication function and a packet communication function. The center includes a voice control unit that performs voice communication with the wireless mobile terminal while the wireless mobile terminal is executing packet communication, a voice recognizing unit that recognizes a voice signal which the voice control unit has received from the wireless mobile terminal, an information searching unit that searches for information corresponding to voice information recognized by the voice recognizing unit, a voice converting unit that converts information, which is convertible into a voice among information searched by the information searching unit, into a voice signal and outputs the voice signal to the voice control unit, and a packet control unit that transmits information, which is displayable on a screen among information searched by the information searching unit, to the wireless mobile terminal through packet communication. Here, the voice control unit of the center is provided with a correspondence table of an own station IP address and an own station voice communication address of a wireless mobile terminal. The voice control unit of the center has a function of notifying the packet control unit of the own station IP address, which is obtained with reference to the correspondence table based on the own station voice communication address of the wireless mobile terminal, through a caller number notifying function at the time of the start of voice communication. This allows information search word or data to be input by voice, and thus operability of the wireless mobile terminal can be improved, and a search result can be confirmed through an image or a text.

Patent Document 2 (Japanese Patent Application Laid-Open No. 2003-125109) discloses a voice input service providing method of assisting voice-based information input to network content during a browse of the network content through a terminal having a data communication function and a voice communication function. The method includes a first step of receiving a content delivery request from a terminal through a data communication path by a content providing apparatus, determining whether or not requested content is content set to be associated with a voice input service, adding link destination information with a voice input service providing apparatus to the corresponding content according to the determination result and transmitting the addition result to a terminal of a request source, a second step of establishing a voice communication path between a corresponding terminal and the voice input service providing apparatus according to a selection operation of the link destination information in the transmitting terminal, and a third step of recognizing an input voice from a terminal through a voice communication path and transmitting the recognition result to the content providing apparatus, by the voice input service providing apparatus. Through this method, a voice input to an information input column of content displayed on a terminal can be performed in synchronization with a content display.

Patent Document 3 (Japanese Patent Application Laid-Open No. 2005-110034) discloses a telephone answering assisting system that assists an answerer who answers a telephone call by causing customer information of a telephone call received at a private branch exchange (PBX) having an interface with a CTI server and including a plurality of extension telephones to be displayed on a screen an information device connected to the CTI server through a local area network (LAN). The CTI server includes a voice recognizing unit that recognizes a voice signal of conversation exchanged between a caller of the telephone call and the answerer of the telephone call and outputs text data and an information storage unit that stores the text data output from the voice recognizing unit. The information device displays either or both of the text data output from the voice recognizing unit and text data stored in the information storage unit on a screen as text.

Patent Document 4 (Japanese Patent Application Laid-Open No. 2000-148677) discloses the following technique. When a connection with a web server is made, content including a button to request a connection with an agent side is displayed on a web screen. When one's own telephone information is registered to an entry of customer information, the customer can receive a callback from the agent side by clicking the button. The customer can select a communication method with the agent such as a normal wire telephone, an Internet phone, or chatting at his/her desire, and can receive a callback through the selected communication method. Further, a skill group of the agent can be selected.

RELATED DOCUMENT

Patent Document

[Patent Document 1] Japanese Patent Application Laid-Open No. 2001-268241
[Patent Document 2] Japanese Patent Application Laid-Open No. 2003-125109
[Patent Document 3] Japanese Patent Application Laid-Open No. 2005-110034
[Patent Document 4] Japanese Patent Application Laid-Open No. 2000-148677

DISCLOSURE OF THE INVENTION

Technical Problem

However, in the techniques disclosed in Patent Documents 1 to 3, for example, in Patent Document 1, a correspondence table between an own station IP address and an own station voice communication address of a wireless mobile terminal is prepared, and when a voice recognition process is performed, a terminal for receiving a voice and an apparatus for displaying resultant text data are fixed in advance. For this reason, it was difficult to make a flexible support of inputting a voice using an arbitrary terminal and recognizing resultant text data by an arbitrary apparatus.

The present invention has been made in light of the above-mentioned problems, and it is an object of the present invention to provide a voice input system and a voice input program, which are capable of solving the problem in that it was difficult to input a voice using an arbitrary terminal and to recognize resultant text data by an arbitrary apparatus when a voice recognition process is performed.

SUMMARY OF THE INVENTION

According to the present invention, there is provided a voice input system which includes:

a processing request receiving unit that receives identification information of a telephone that is to receive a callback, in order to input a voice, together with a voice recognition process request;

a call originating unit that originates a callback based on the identification information of the telephone received by the processing request receiving unit;

a voice data receiving unit that receives voice data of a user's voice when the callback originated by the call originating unit is received and the user's voice is input; and a voice recognition result storage unit that stores result data which is data of a voice recognition result of the voice data received by the voice data receiving unit in association with the identification information of the telephone.

According to the present invention, there is provided a voice input program causing a computer to function as:

a processing request receiving unit that receives identification information of a telephone that is to receive a callback, in order to input a voice, together with a voice recognition process request;

a call originating unit that originates a callback based on the identification information of the telephone received by the processing request receiving unit;

a voice data receiving unit that receives voice data of a user's voice when the callback originated by the call originating unit is received and the user's voice is input; and a voice recognition result storage unit that stores data of a voice recognition result of the voice data received by the voice data receiving unit in association with the identification information of the telephone.

A conversion of an arbitrary combination of the above components or an expression of the present invention between a method, an apparatus, a system, a recording medium, a computer program, or the like is also effective as an embodiment of the present invention.

Advantageous Effects of Invention

According to the present invention, it is possible to input a voice using an arbitrary terminal and to recognize resultant text data by an arbitrary apparatus when a voice recognition process is performed.

BRIEF DESCRIPTION OF THE DRAWINGS

FIG. 2 is a diagram illustrating an example of an internal configuration of a voice recognition result storage unit.

FIG. 15 is a diagram illustrating an example of an internal configuration of a template storage unit.

DESCRIPTION OF EMBODIMENTS

Figure 1:
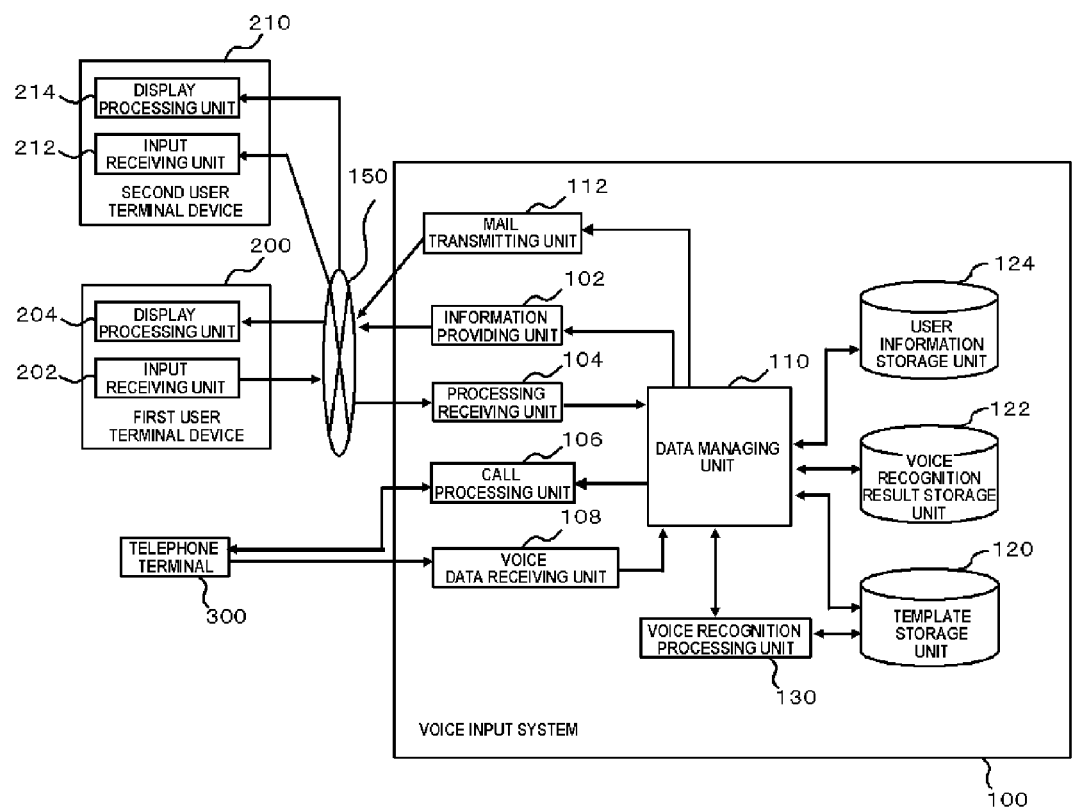
FIG. 1 is a block diagram illustrating an example of a network structure including a voice input system according to an embodiment of the present embodiment.

Hereinafter, embodiments of the present invention will be described with reference to the accompanying drawings. In all drawings, the same components are denoted by the same reference numerals, and a description thereof will not be repeated.

In the present embodiment, a user who desires to input a message or the like by voice and acquire data of a voice recognition result of the message inputs identification information of a telephone which is to receive a callback in order to input a voice to a voice input system. Here, the identification information of the telephone may be identification information such as a telephone number of a telephone terminal which the user desires to receive a callback. A voice input system makes a callback based on the input identification information of the telephone. Then, when the user answers the callback and inputs a voice, the voice input system performs a voice recognition process on voice data of the voice. Then, the voice input system stores data representing a result of the voice recognition process in association with the identification information of the telephone. Through this configuration, the user can access a predetermined web page from any terminal device, and can input a voice and acquire data of a voice recognition result by inputting any desired telephone number. Thereafter, by designating identification information of a telephone, text data of a voice recognition result can be acquired from any terminal device.

First Embodiment

FIG. 1 is a block diagram illustrating a network structure including a voice input system according to the present embodiment.

The network structure illustrated in FIG. 1 includes a voice input system 100, a first user terminal device 200 (a user terminal device 1) and a second user terminal device 210 (a user terminal device 2) which are connected to the voice input system 100 through a network 150, and a telephone terminal 300. For example, the network 150 may be the Internet or the Intranet.

The voice input system 100 includes a web application. The first user terminal device 200 and the second user terminal device 210 may be a personal computer (PC) of the user. In the present embodiment, a browser is installed in each user terminal device. Each user can access the web application of the voice input system 100 from the browser of each user terminal device through the network 150, activate the web application, and use a function of the voice input system 100.

The first user terminal device 200 includes an input receiving unit 202 and a display processing unit 204. For example, the input receiving unit 202 includes an operating unit such as a keyboard. The first user terminal device 200 receives the user's instruction through the input receiving unit 202. The display processing unit 204 of the first user terminal device 200 includes a display and a browser, and displays a web page supplied from an information providing unit 102 of the voice input system 100 on the display. The user's instruction input through the input receiving unit 202 is supplied to a processing receiving unit 104 of the voice input system 100 through the network 150.

The second user terminal device 210 includes an input receiving unit 212 and a display processing unit 214 similarly to the first user terminal device 200. The input receiving unit 212 and the display processing unit 214 have the same functions as the input receiving unit 202 and the display processing unit 204 of the first user terminal device 200. For example, the first user terminal device 200 and the second user terminal device 210 may be configured with a PC or the like.

The voice input system 100 includes the information providing unit 102, the processing receiving unit 104, a call processing unit 106, a voice data receiving unit 108, a data managing unit 110, a mail transmitting unit 112, a template storage unit 120, a voice recognition result storage unit 122, a user information storage unit 124, and a voice recognition processing unit 130. In the present embodiment, the functions of the information providing unit 102 and the processing receiving unit 104 may be implemented by a web application.

The information providing unit 102 (an information providing unit) provides a web page to each user terminal connected through the network 150. The processing receiving unit 104 (a processing request receiving unit and a provision request receiving unit) receives an instruction input through a web page from each user terminal connected through the network 150.

The processing receiving unit 104 (a processing request receiving unit) receives identification information of a telephone to which a voice is to be input for a voice recognition process together with a voice recognition process request from a user terminal connected through the network 150. In the present embodiment, a telephone number of a telephone terminal may be used as the identification information of the telephone. In the below, a description will be made in connection with an example in which a telephone number of a telephone terminal may be used as the identification information of the telephone.

The call processing unit 106 (a call originating unit) performs a process of originating a call to a telephone terminal based on a telephone number of the telephone terminal received by the processing receiving unit 104. The function of the call processing unit 106 may be implemented by a click-to-call plug-in included in the web application of the voice input system 100.

The voice data receiving unit 108 receives a voice as voice data when a call by the call originating process of the call processing unit 106 is received and the user's voice is input from the telephone terminal.

The data managing unit 110 performs a process of identifying data processed by each functional block of the voice input system 100, for example, in association with a telephone number, and exchanging the data with another functional block. The data managing unit 110 supplies voice data received by the voice data receiving unit 108 to the voice recognition processing unit 130, and acquires result data which is voice recognition result data of the voice data from the voice recognition processing unit 130.

The voice recognition processing unit 130 performs voice recognition on the voice data supplied from the data managing unit 110, and transmits the result data of the voice recognition to the data managing unit 110. The voice recognition processing unit 130 may convert the result data into a predetermined data format (for example, text data) and then transmit the converted result data to the data managing unit 110. The data format of the result data transmitted from voice recognition processing unit 130 to the data managing unit 110 is not particularly limited. In FIG. 1, the voice recognition processing unit 130 is configured to be included in the voice input system 100. However, the voice recognition processing unit 130 may be configured to be disposed in an external terminal unlike the other functional blocks of the voice input system 100. For example, the voice recognition processing unit 130 may be configured to be connected to the voice input system 100 through the network 150 or the like.

The data managing unit 110 stores the result data acquired from the voice recognition processing unit 130 in the voice recognition result storage unit 122 (a voice recognition result storage unit) in association with a telephone number. The data managing unit 110 may also store a time at which voice data is acquired by the voice data receiving unit 108 in the voice recognition result storage unit 122 in association with the result data acquired from the voice recognition processing unit 130. The data managing unit 110 may also store the voice data acquired by the voice data receiving unit 108 in the voice recognition result storage unit 122 in association with the result data acquired from the voice recognition processing unit 130.

FIG. 2 is a diagram illustrating an example of an internal configuration of the voice recognition result storage unit 122.

The voice recognition result storage unit 122 includes a telephone number column, a time column, a result data column, and a voice data column. A telephone number of a telephone terminal to which the call processing unit 106 has originates a call is stored in the telephone number column. A time (date and time) at which voice data is acquired by the voice data receiving unit 108 is stored in the time column. Result data which is data of a result obtained by performing the voice recognition process through the voice recognition processing unit 130 is stored in the result data column. Voice data acquired by the voice data receiving unit 108 is stored in the voice data column.

Returning to FIG. 1, the processing receiving unit 104 (a provision request receiving unit) receives a result data provision request together with a telephone number of a telephone terminal from a user terminal device connected through the network 150. At this time, in the present embodiment, the processing receiving unit 104 may also receive identification information of a user terminal device from the user terminal device connected through the network 150. Here, an IP address of identification information of a user terminal device may be used as the identification information of the user terminal device. The identification information of the user terminal device may be automatically transmitted from the user terminal device to the voice input system 100 when a connection between the user terminal device and the voice input system 100 is established instead of being input from the user.

Based on the telephone number of the telephone terminal received by the processing receiving unit 104, the data managing unit 110 extracts corresponding result data from the voice recognition result storage unit 122 using the telephone number as a key.

The information providing unit 102 supplies the result data extracted by the data managing unit 110 to the corresponding user terminal device based on the identification information of the user terminal device. The information providing unit 102 may convert the extracted result data into a predetermined data format and provide the converted result data to the corresponding user terminal device. For example, the information providing unit 102 may provide text data to the user terminal device as the result data. Furthermore, the information providing unit 102 may provide data (SGML, HTML, Tex, and the like) with markup such as an utterance time, and reading or part of speech of a word to the user terminal device. For example, when the voice recognition processing unit 130 converts the result data into a predetermined data format in advance and stores the converted result data in the voice recognition result storage unit 122, the data format converting process by the information providing unit 102 is unnecessary.

The template storage unit 120 stores template text such as a message which the user of the voice input system 100 inputs through the telephone terminal 300 as described later.

FIG. 15 is a diagram illustrating an example of an internal configuration of the template storage unit 120.

The template storage unit 120 includes a template number column, a title column, a template text column, and a feature data column. The template may be prepared by an administrator of the voice input system 100 or may be appropriately set by the user of the voice input system 100. Here, for example, a fill-in-the-blank position present in "template text" of a template no. 1, for example, the fact that a personal name is filled in "OO" of "from Mr. OO" or the fact that a telephone number (digits) is filled in "OOOO" of "at a telephone number OOOO" is stored in the feature data column. By using the template having this configuration, the accuracy of voice recognition can be increased compared to when the user freely inputs a message.

The mail transmitting unit 112 transmits the result data to a predetermined mail address designated by the user. The user may designate a mail address to which the result data is to be transmitted when the result data is displayed and confirmed.

In the present embodiment, the user of the user terminal device accessing the web page provided by the voice input system 100 may register to a service provided by the voice input system 100 in advance. In this case, the user may be given an ID and a password. The user may register a transmission destination address to which a mail is desired to be transmitted in advance. The user information storage unit 124 stores information such as an ID and a password of the user and a desired transmission destination registered by the user. Here, when the user logs in using an ID and a password in order to access the web page provided by the voice input system 100, the user is recognized. In this case, a list of mail addresses registered in advance can be displayed on the web page displayed to the user. Thus, the user registered to the service can transmit a message registered by himself or herself to a desired mail address.

In the present embodiment, for example, a portable telephone terminal (including a personal handyphone system (PHS)), an IP phone, an analog fixed telephone, or the like may be used as the telephone terminal 300. In the present embodiment, the user inputs a voice through the telephone terminal 300. For this reason, the first user terminal device 200 or the second user terminal device 210 do not need to prepare a microphone for inputting a voice or the like.

Next, a processing procedure of a network structure in the present embodiment will be described.

Figure 3:
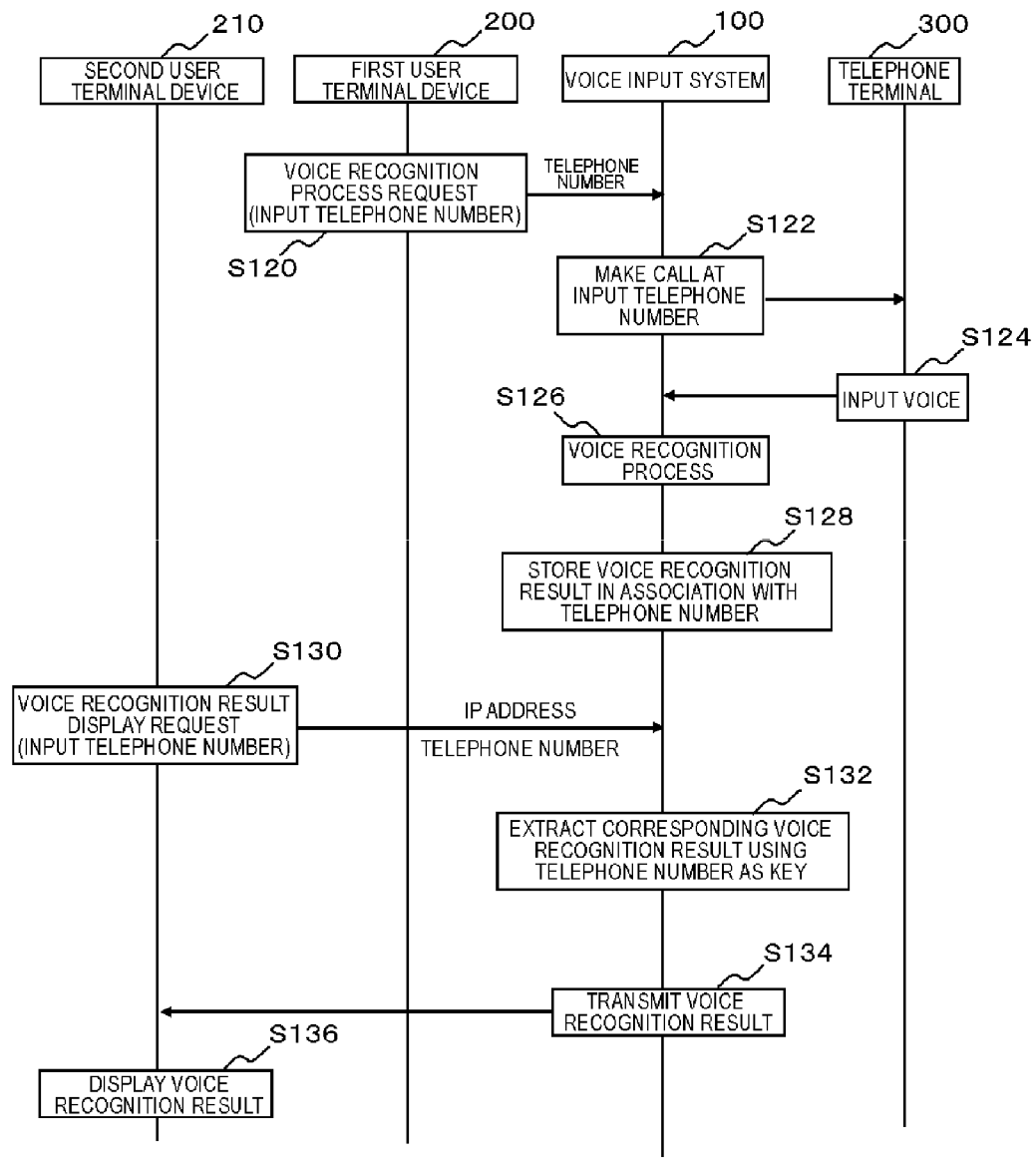
FIG. 3 is a flowchart illustrating an example of a processing procedure of a network structure including a voice input system according to an embodiment of the present embodiment.

FIG. 3 is a flowchart illustrating a processing procedure of a network structure including the voice input system 100 in the present embodiment. Here, it is assumed that the user receives a callback through the telephone terminal 300 illustrated in FIG. 1.

First, the user inputs a telephone number of the telephone terminal 300 which is to receive a callback through the first user terminal device 200, and then makes a voice recognition process request (step S120). Specifically, the user accesses a web page such as a message input page provided by the voice input system 100 through the first user terminal device 200, inputs the telephone number of the telephone terminal 300 to the web page, and makes a voice recognition process request.

Figure 4:
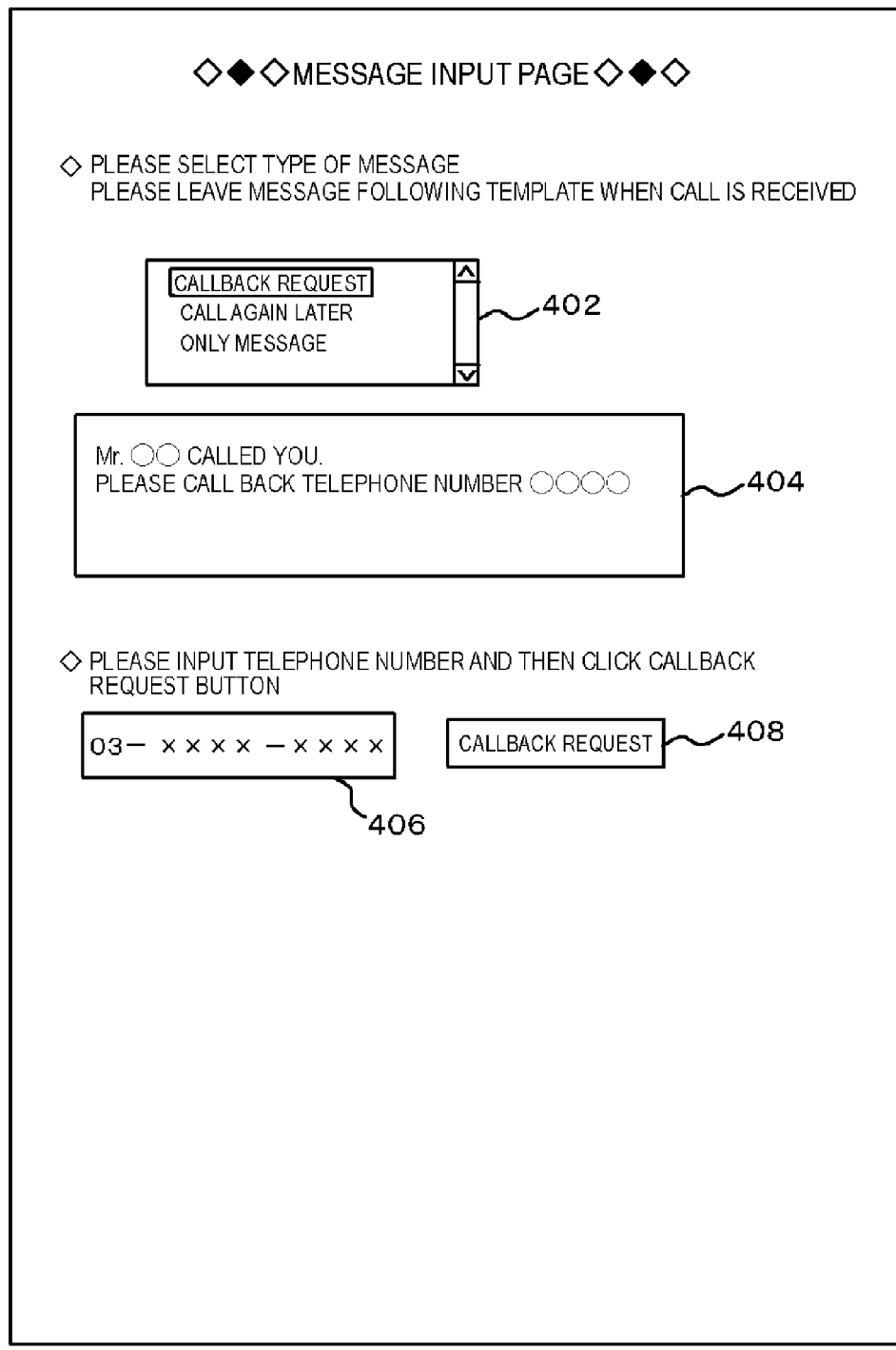
FIG. 4 is a diagram illustrating an example of a message input page screen displayed by a display processing unit of a first user terminal device.

FIG. 4 is a diagram illustrating an example of a message input page screen 420, which is supplied from the information providing unit 102 of the voice input system 100, displayed by the display processing unit 204 of the first user terminal device 200. A template selection box 402, a template text display area 404, a telephone number input box 406, a callback request button 408, and the like are displayed on the message input page screen 420.

Here, titles of templates stored in the template storage unit 120 of the voice input system 100 are displayed on the template selection box 402. Here, "callback request," "call again later," "only message," and the like are displayed as selectable templates. For example, when the user selects "callback request," "Mr. OO called you. Please call back at telephone number OOOO" which is a template text associated with "callback request" is displayed on the template text display area 404.

Figure 5:
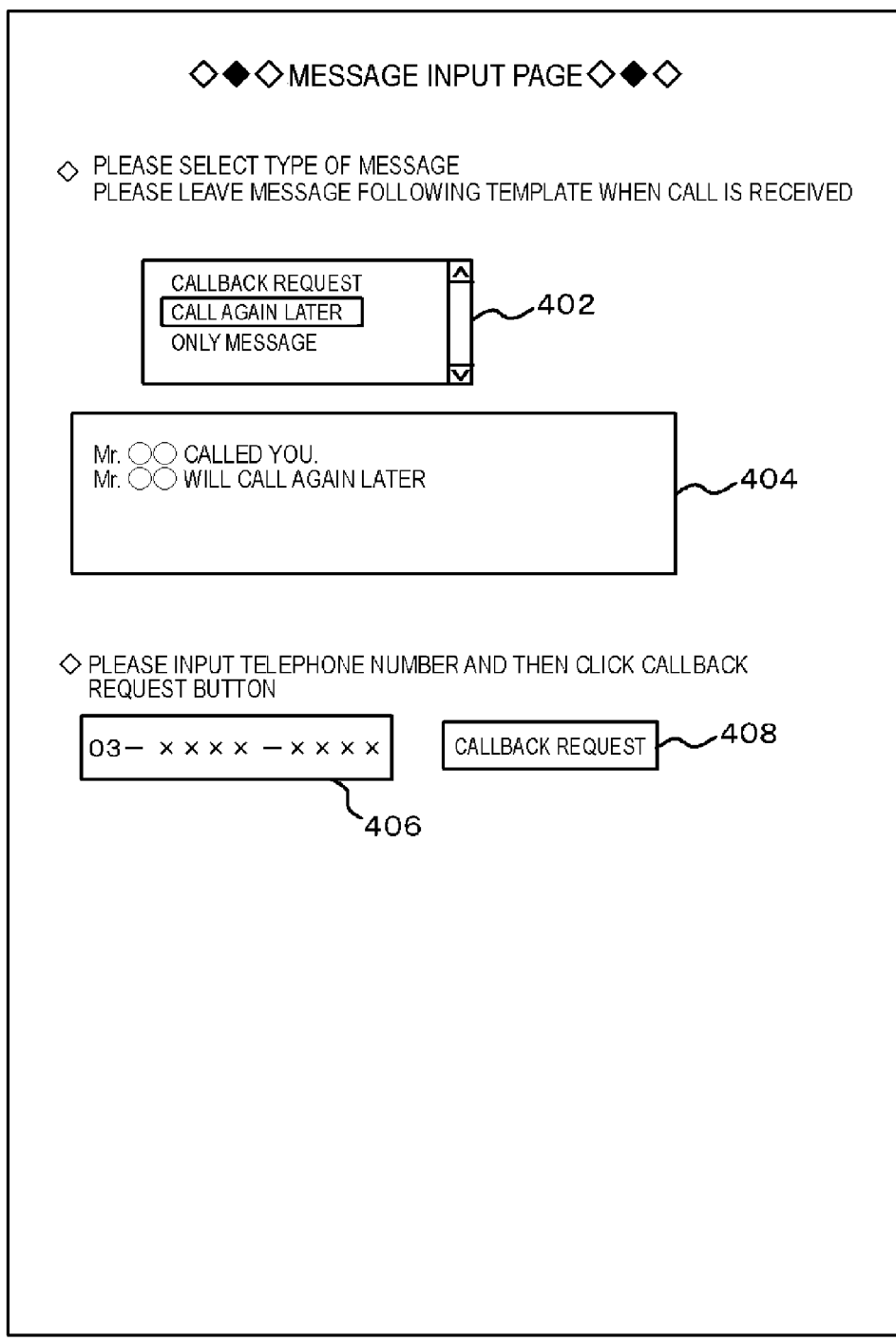
FIG. 5 is a diagram illustrating an example of a message input page screen displayed by the display processing unit of the first user terminal device.

FIG. 5 is a diagram illustrating a state of the message input page screen 420 illustrated in FIG. 4 when the user selects "call again later" in the template selection box 402. Here, "Mr. OO called you. He/she will call you again" which is a template text associated with "call again later" is displayed on the template text display area 404.

When the user selects a template in the template selection box 402, inputs a telephone number of the telephone terminal 300, for example, "03-xxxx-xxxx" to the telephone number input box 406, and then clicks the callback request button 408, the voice recognition process request and the telephone number are transmitted to the voice input system 100. The template may be selected until the telephone terminal 300 receives a call after the callback request button 408 is clicked, after the telephone terminal 300 receives a call, or the like.

Returning to FIG. 3, when the voice recognition process request and the telephone number are transmitted from the first user terminal device 200, the processing receiving unit 104 receives the voice recognition process request and the telephone number and notifies the data managing unit 110 of the voice recognition process request and the telephone number. The data managing unit 110 instructs the call processing unit 106 to originate a call at the telephone number. Then, the call processing unit 106 makes a phone call at the received telephone number "03-xxxx-xxxx" (step S122).

When the telephone terminal 300 receives the call and the user answers the call, the call processing unit 106 may output a voice such as "please leave a message." At this time, the user inputs a message by voice through the telephone terminal 300. The user may input a voice while viewing the message input page screen 420 displayed on the display processing unit 204 of the first user terminal device 200. Thus, the user may utter a message, following the template text displayed on the template text display area 404. Further, the user may select a desired template from the template selection box 402 before clicking the callback request button 408 and then cause the template text to be displayed on the template text display area 404. Thus, the user can smoothly utter a message without being stuck with phrases. Further, as described above, by using the template, the accuracy of voice recognition can be increased compared to when the user freely inputs a message.

In the voice input system 100, the voice data receiving unit 108 receives voice data of the voice which the user has input through the telephone terminal 300 (step S124) and notifies the data managing unit 110. The data managing unit 110 causes the voice recognition processing unit 130 to perform the voice recognition process on the input voice data. The voice recognition processing unit 130 performs the voice recognition process (step S126). In the present embodiment, the data managing unit 110 can recognize a template number used by the user and notify the voice recognition processing unit 130 of the template number. Thus, the voice recognition processing unit 130 can perform the voice recognition process, in terms of feature data of the template of the template number, with reference to the template storage unit 120. Accordingly, the accuracy of the voice recognition process by the voice recognition processing unit 130 can be increased.

Even though not illustrated, the voice input system 100 may perform an error process of displaying an error message on the message input page screen 420 when the user does not answer even though the call processing unit 106 has originated a call in step S122.

When the voice recognition process of the voice recognition processing unit 130 ends, the data managing unit 110 stores the result data of the voice recognition process in the voice recognition result storage unit 122 in association with the telephone number (step S128).

Until the voice recognition processing unit 130 performs the voice recognition process and then the result data of the voice recognition process is stored in the voice recognition result storage unit 122, after the processing receiving unit 104 receives the voice recognition process request from the first user terminal device 200, the data managing unit 110 manages data processed by each functional block in association with the telephone number of the telephone terminal 300.

Then, the process of inputting a voice to the voice input system 100 and leaving a message ends. Thus, even though a microphone to input a voice is not particularly provided, a message can be simply left by voice through the voice recognition process. Further, by accessing a predetermined web page through any terminal device and inputting a desired arbitrary telephone number, the user can input a voice and acquire the result data of the voice recognition process.

Thereafter, by accessing a predetermined web page through any desired terminal device and designating a telephone number, the user can view the result data stored in the voice recognition result storage unit 122 of the voice input system 100.

For example, the user inputs the telephone number of the telephone terminal 300 through the second user terminal device 210 different from the first user terminal device 200, and makes a voice recognition result display request. At this time, in the present embodiment, the IP address of the second user terminal device 210 is also transmitted to the voice input system 100 together with the telephone number of the telephone terminal 300 and the voice recognition result display request (step S130).

Specifically, the user accesses a web page such as a message confirmation page screen provided from the voice input system 100 through the second user terminal device 210.

Figure 6:
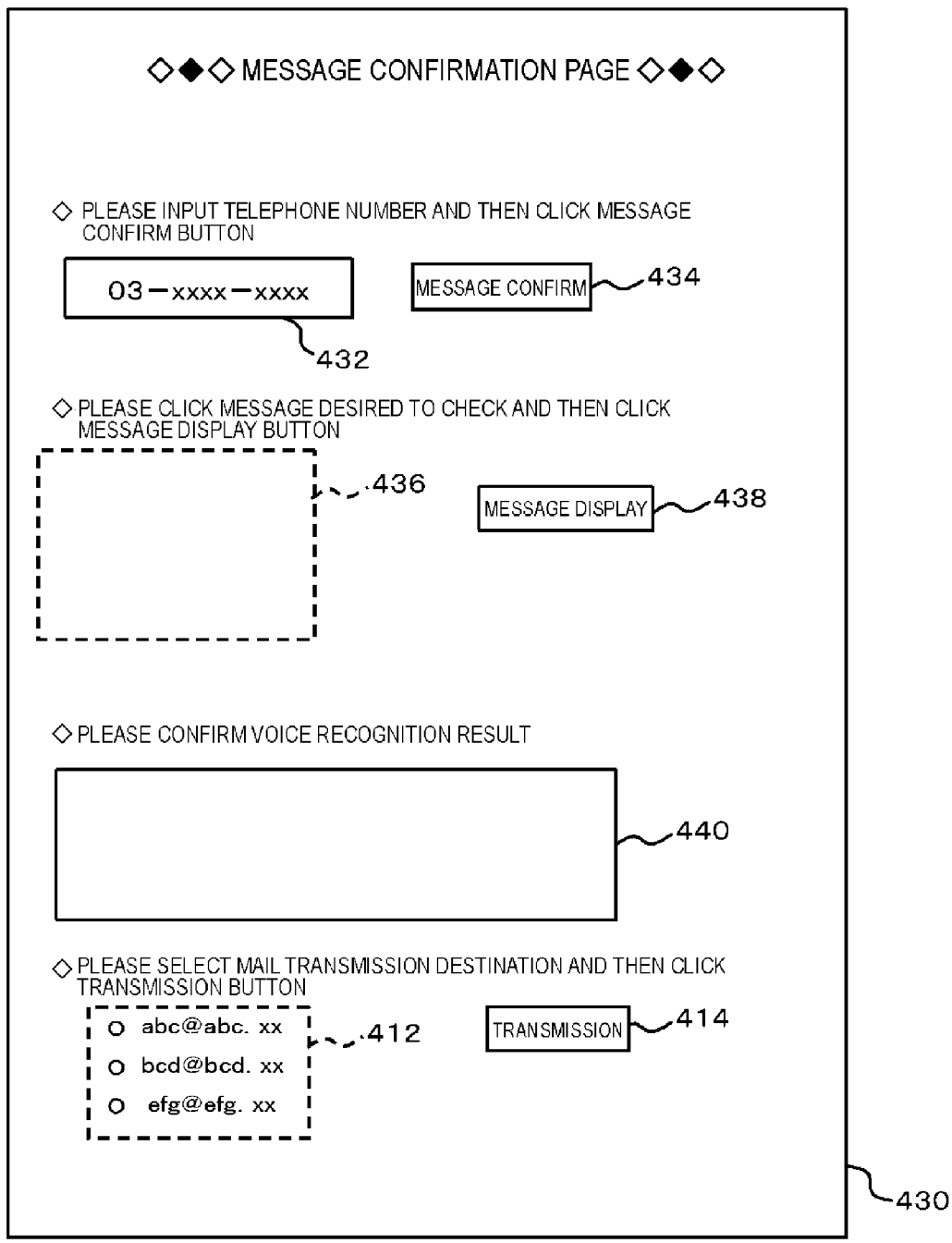
FIG. 6 is a diagram illustrating an example of a message confirmation page screen displayed by a display processing unit of a second user terminal device.

FIG. 6 is a diagram illustrating an example of a message confirmation page screen 430, which is supplied from the information providing unit 102 of the voice input system 100, displayed on the display processing unit 214 of the second user terminal device 210. A telephone number input box 432, a message confirmation button 434, a message list display area 436, a message display button 438, a message display area 440, a mail transmission destination display area 412, a transmission button 414, and the like are displayed on the message confirmation page screen 430. For example, when the user has registered to the service provided by the voice input system 100 and logged in by inputting an ID and a password, a list of mail addresses to which the user desires to transmit a mail can be displayed on the mail transmission destination display area 412 in this stage.

When the user inputs the telephone number of the telephone terminal 300 such as "03-xxxx-xxxx" to the telephone number input box 432 and then clicks the message confirmation button 434, the telephone number and the voice recognition result display request are transmitted to the voice input system 100. At this time, the IP address of the second user terminal device 210 is also transmitted from the second user terminal device 210 to the voice input system 100 together with the telephone number and voice the recognition result display request.

Returning to FIG. 3, when the voice recognition result display request, the telephone number, and the IP address are input from the second user terminal device 210, the processing receiving unit 104 receives the voice recognition result display request, the telephone number, and the IP address and notifies the data managing unit 110. The data managing unit 110 extracts result data stored in association with the telephone number from the voice recognition result storage unit 122 using the input telephone number as a key (step S132). Next, the data managing unit 110 transmits the result data extracted in step S132 from the information providing unit 102 to the second user terminal device 210 based on the IP address of the second user terminal device 210 (step S134). As a result, in the second user terminal device 210, the display processing unit 214 displays the result data of the voice recognition process (step S136).

In the present embodiment, items of the result data associated with the telephone number used as a key are displayed on the message confirmation page screen 430 as a list before the result data of the voice recognition process is displayed. A description will be made with reference to FIGS. 7 and 8.

Figure 7:
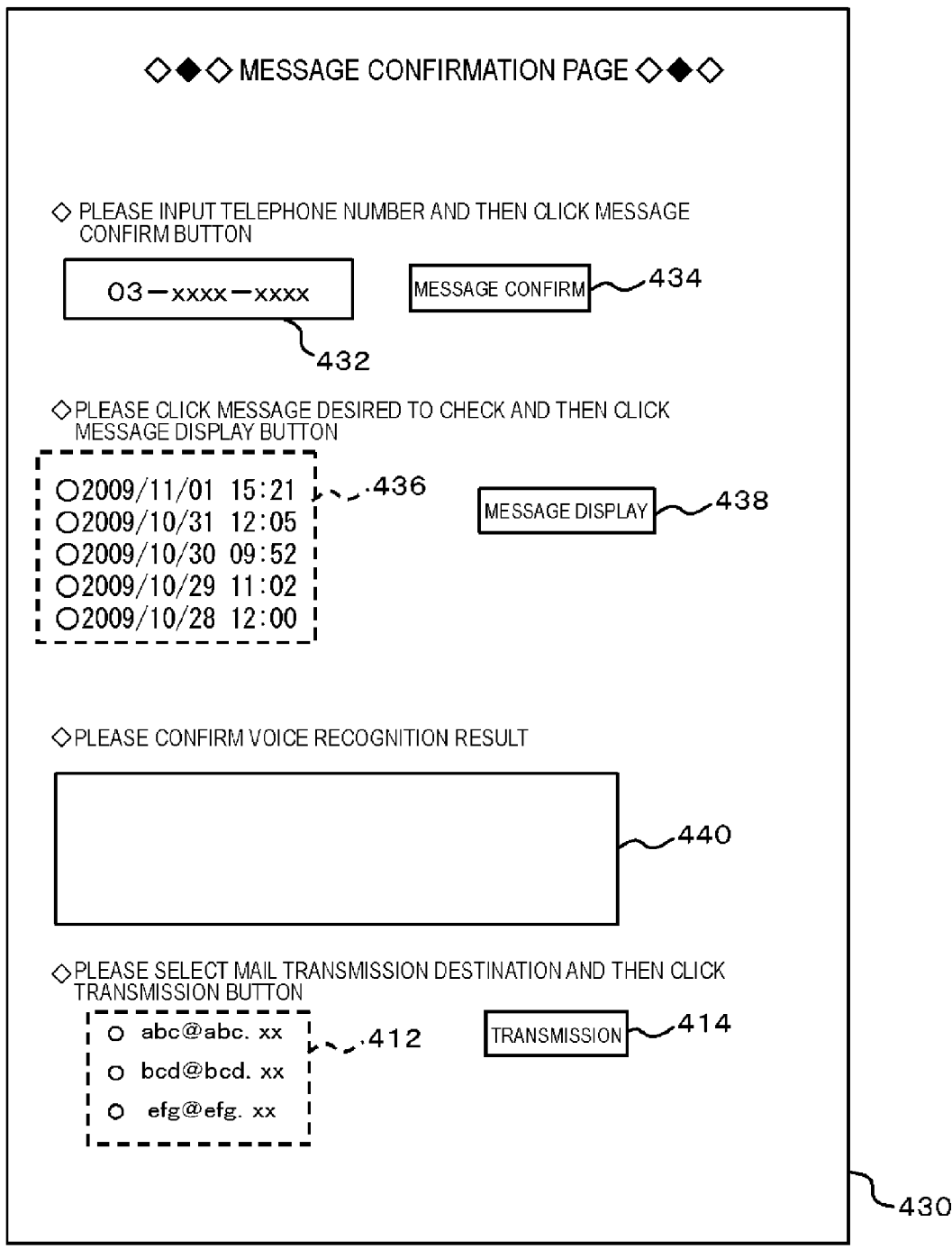
FIG. 7 is a diagram illustrating an example of a message confirmation page screen displayed by the display processing unit of the second user terminal device.

FIG. 7 is a diagram illustrating the message confirmation page screen 430 after the telephone number is input to the telephone number input box 432 and the message confirmation button 434 is clicked. As illustrated in FIG. 7, a time (date and time) of the result data associated with the telephone number "03-xxxx-xxxx" input to the telephone number input box 432 in the voice recognition result storage unit 122 of the voice input system 100 is displayed on the message list display area 436 as an item. As another example, the user may designate and input, for example, a title of a message to be input by voice in the message input page screen 420 illustrated in FIGS. 4 and 5. In the voice input system 100, the data managing unit 110 can store the result data in association with a title designated by the user in the voice recognition result storage unit 122. In this case, a list of titles designated by the user may be displayed on the message list display area 436.

When the user selects any one item of the message list display area 436 and clicks the message display button 438, a corresponding time is transmitted to the voice input system 100.

Figure 8:
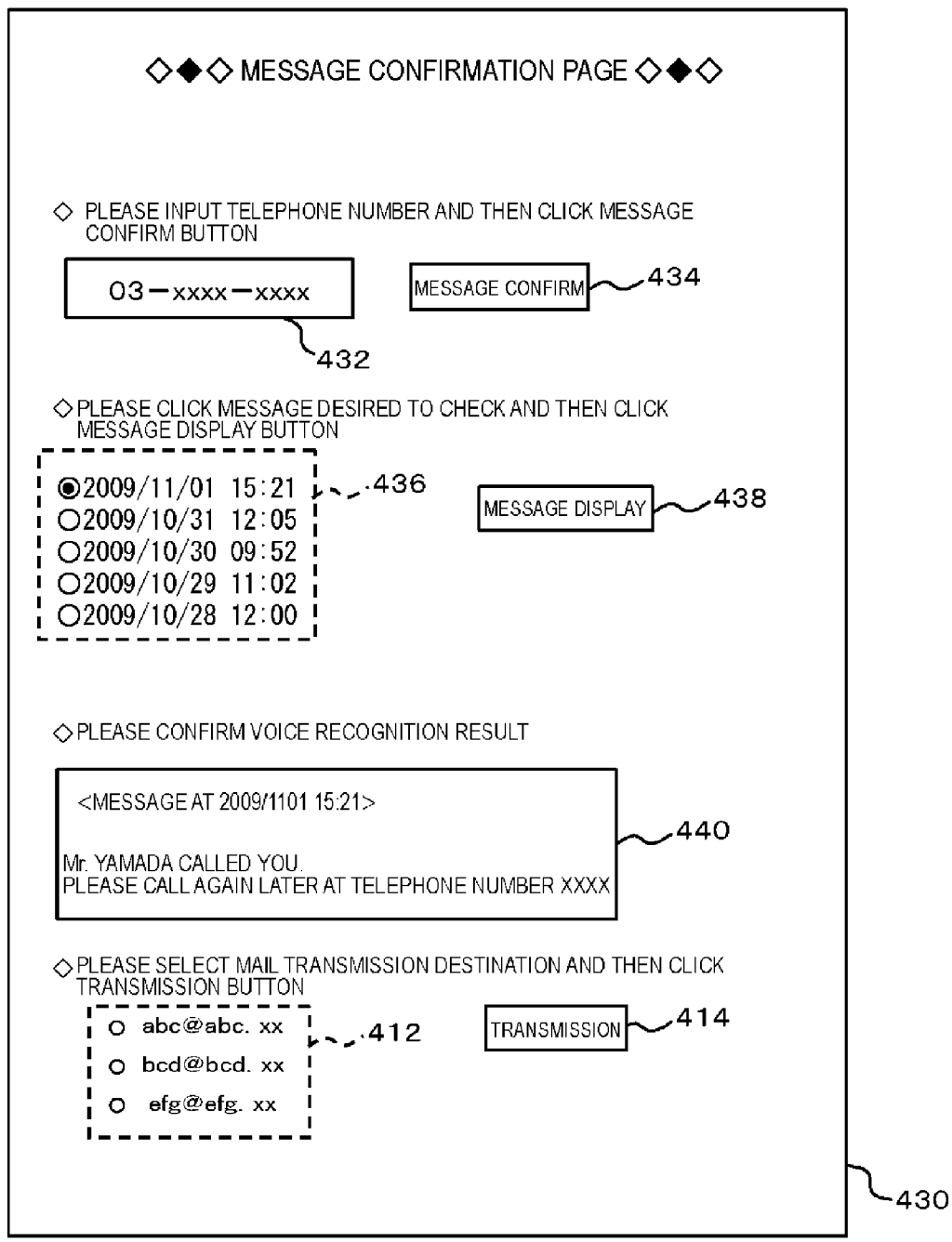
FIG. 8 is a diagram illustrating an example of a message confirmation page screen displayed by the display processing unit of the second user terminal device.

FIG. 8 is a diagram illustrating the message confirmation page screen 430 after the user selects, for example, "2009/11/01 15:21" of the message list display area 436 in the message confirmation page screen 430 illustrated in FIG. 7 and then clicks the message display button 438. As illustrated in FIG. 8, result data associated with a time "2009/11/01 15:21" in the voice recognition result storage unit 122 of the voice input system 100 is displayed on the message display area 440.

Further, the user can appropriately revise a message displayed on the message display area 440 through the input receiving unit 212 of the second user terminal device 210. When the user has revised a message, the message displayed on the message display area 440 may be updated, and the result data stored in the voice recognition result storage unit 122 may be updated.

In the voice input system 100, until an item of result data associated with the telephone number used as a key or the result data is supplied to the second user terminal device 210 and processing such as a revision request from the second user terminal device 210 ends after the processing receiving unit 104 receives the voice recognition result display request, the data managing unit 110 may mange a data exchange between the voice input system 100 and the second user terminal device 210 and perform processing based on the telephone number and the IP address of the second user terminal device 210 previously transmitted from the second user terminal device 210. The data managing unit 110 may store the management information in a temporary storage unit (not illustrated) and perform management.

Further, by selecting a desired transmission destination from the mail addresses displayed on the mail transmission destination display area 412 and clicking the transmission button 414, the user can transmit the message displayed on the message display area 440 to the corresponding transmission destination. The user may set a new mail transmission destination. The mail transmission process is performed by the mail transmitting unit 112 of the voice input system 100.

Figure 9:
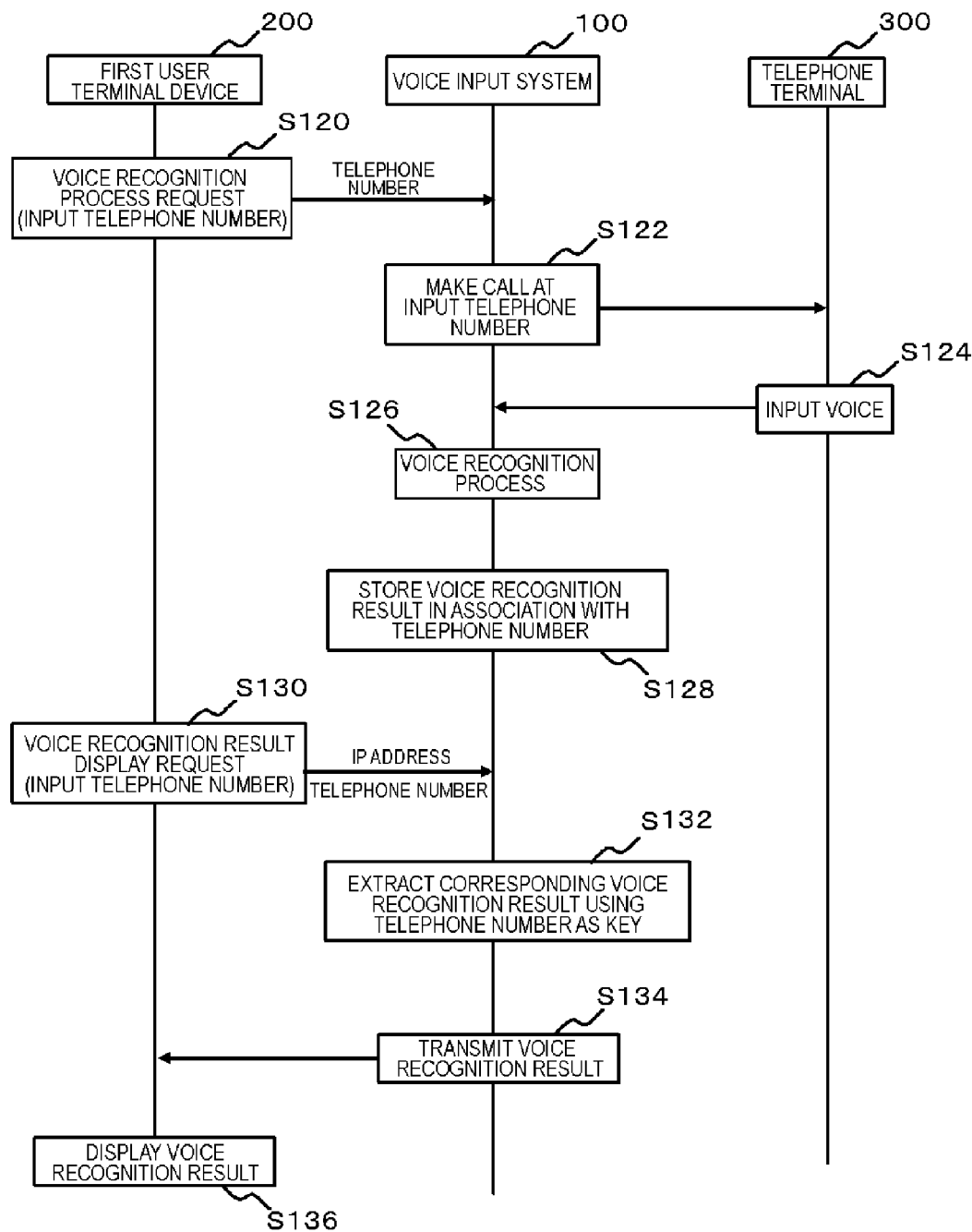
FIG. 9 is a flowchart illustrating another example of a processing procedure of a network structure including a voice input system according to an embodiment of the present invention.

The above description has been made in connection with the example in which a terminal through which the user makes the voice recognition process request is different from a terminal through which the user makes the voice recognition result display request, but the requests may be made by a same terminal. FIG. 9 illustrates a processing procedure when the user makes both the voice recognition process request and the voice recognition result display request through the first user terminal device 200. In this case, since the user terminal that transmits the voice the recognition result display request in step S130 is the first user terminal device 200, in step S130, the IP address of the first user terminal device 200 is transmitted to the voice input system 100. For this reason, in step S134, the information providing unit 102 of the voice input system 100 transmits the result data to the first user terminal device 200.

As described above, in the present embodiment, when the voice recognition process is performed, a voice can be input by any telephone terminal, and the result data of the voice recognition process can be confirmed by any apparatus.

According to the above-described configuration, since a voice is input using the telephone terminal 300, the user does not need to set an environment where a microphone is prepared like when a voice is input from a terminal such as a PC. Thus, the user who does not frequently use the voice recognition process or voice input through a terminal such as a PC can easily use the voice recognition process.

Second Embodiment

Figure 10:
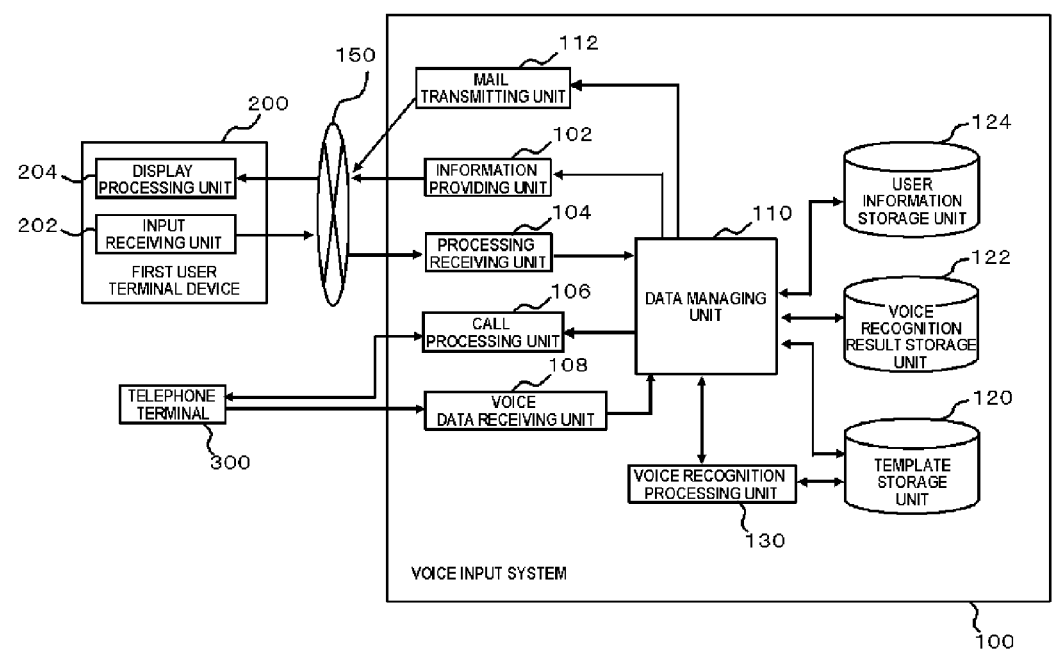
FIG. 10 is a block diagram illustrating an example of a network structure including a voice input system according to an embodiment of the present embodiment.

FIG. 10 is a block diagram illustrating another example of the voice input system 100.

In the present embodiment, the voice input system 100 has the same configuration as in FIG. 1.

The present embodiment is different from the first embodiment in that result data of the voice recognition process is displayed on the user's user terminal device at the same time when a voice is input.

Figure 11:
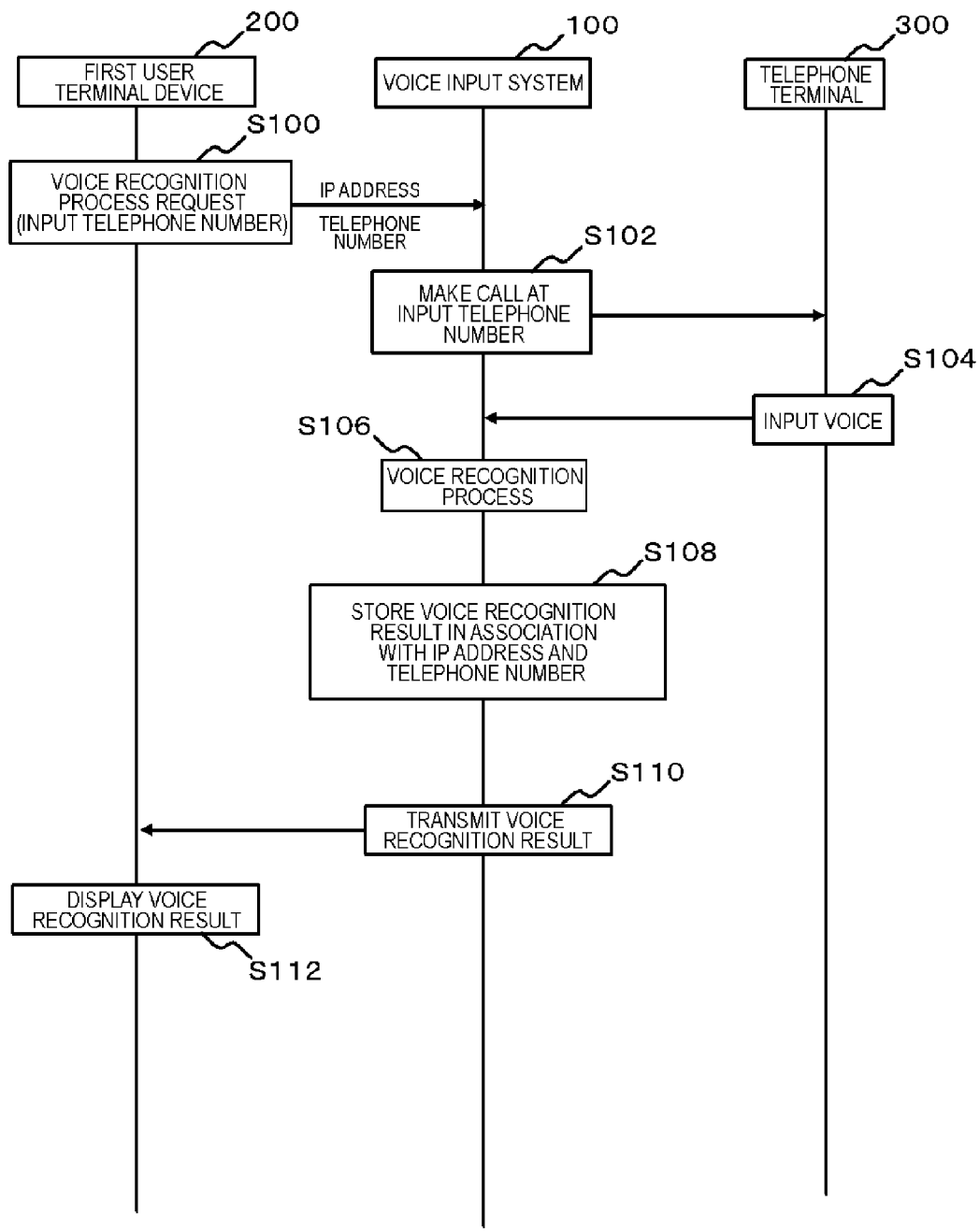
FIG. 11 is a flowchart illustrating an example of a processing procedure of a network structure including a voice input system according to an embodiment of the present invention.

Next, a processing procedure of a network structure in the present embodiment will be described. FIG. 11 is a flowchart illustrating a processing procedure of a network structure including the voice input system 100 in the present embodiment. Here, it is assumed that the user receives a callback through the telephone terminal 300 illustrated in FIG. 10.

First, the user inputs a telephone number of the telephone terminal 300 which is to receive a callback through the first user terminal device 200, and then makes a voice recognition process request (step S100). Specifically, the user accesses a web page such as a message input page provided by the voice input system 100 through the first user terminal device 200, inputs the telephone number of the telephone terminal 300 to the web page, and makes a voice recognition process request.

Figure 12:
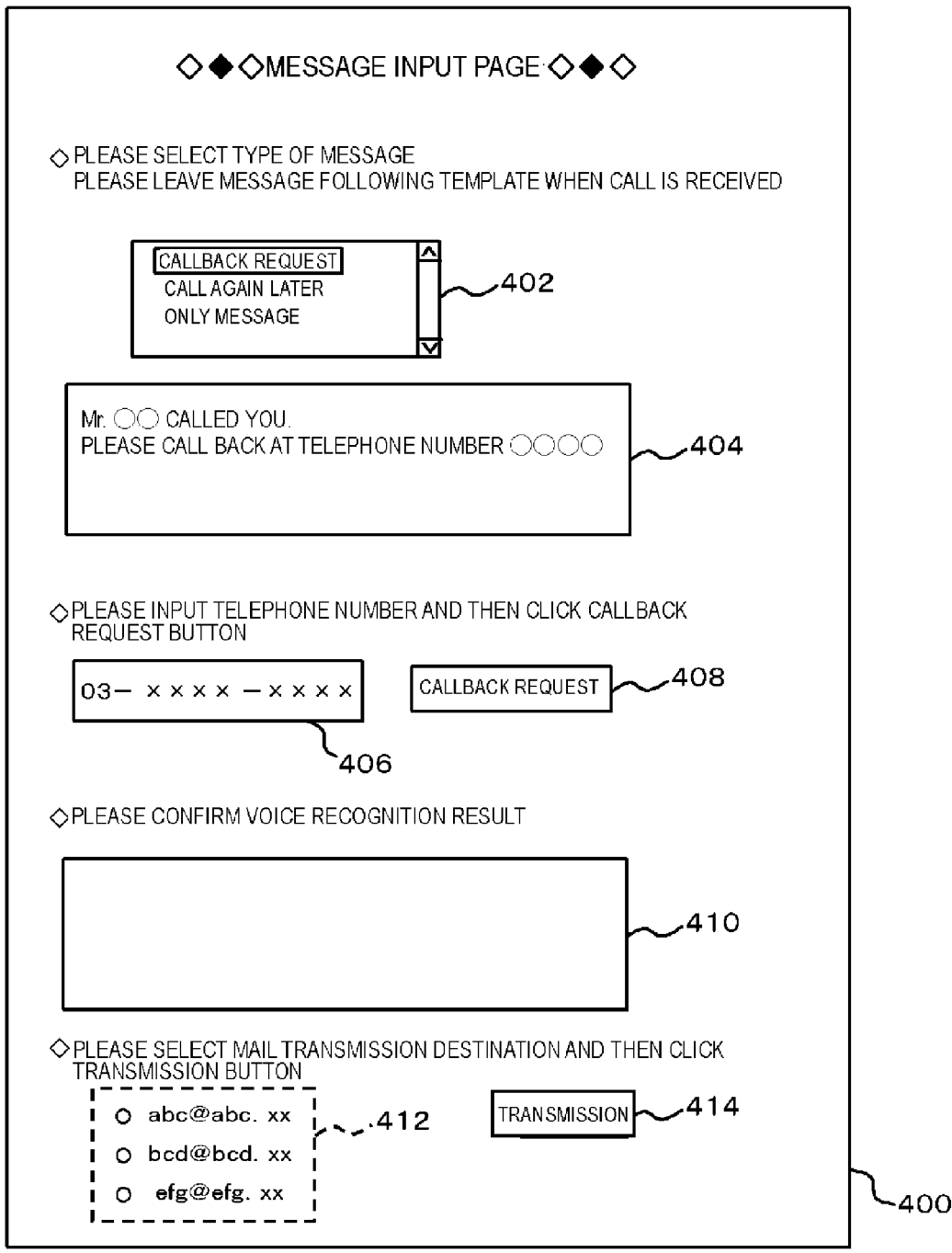
FIG. 12 is a diagram illustrating an example of a message input page screen displayed by a display processing unit of a first user terminal device.

FIG. 12 is a diagram illustrating an example of a message input page screen 400, which is supplied from the information providing unit 102 of the voice input system 100, displayed by the display processing unit 204 of the first user terminal device 200. A template selection box 402, a template text display area 404, a telephone number input box 406, a callback request button 408, a voice recognition result display area 410, a mail transmission destination display area 412, a transmission button 414, and the like are displayed on the message input page screen 400.

The template selection box 402, the template text display area 404, the telephone number input box 406, and the callback request button 408 may have the same configurations as those described with reference to FIGS. 4 and 5.

When the user selects a template in the template selection box 402, inputs a telephone number of the telephone terminal 300, for example, "03-xxxx-xxxx" to the telephone number input box 406, and then clicks the callback request button 408, the voice recognition process request and the telephone number are transmitted to the voice input system 100. At this time, in the present embodiment, the IP address of the first user terminal device 200 is transmitted from the first user terminal device 200 to the voice input system 100 together with the voice recognition result display request and the telephone number. As described in the first embodiment, the identification information of the user terminal device may be automatically transmitted from the user terminal device to the voice input system 100 when a connection between the user terminal device and the voice input system 100 is established instead of being input from the user.

In the present embodiment, during a time period until the voice recognition processing unit 130 performs the voice recognition process and then the result data of the voice recognition process is transmitted to the first user terminal device 200 after the processing receiving unit 104 receives the voice recognition process request from the first user terminal device 200, the data managing unit 110 of the voice input system 100 manages data processed by each functional block in association with the telephone number of the telephone terminal 300.

Returning to FIG. 11, when the voice recognition process request, the telephone number, and the IP address are transmitted from the first user terminal device 200, the processing receiving unit 104 receives the voice recognition process request, the telephone number, and the IP address and notifies the data managing unit 110 of the voice recognition process request, the telephone number, and the IP address. The data managing unit 110 instructs the call processing unit 106 to originate a call at the corresponding telephone number. Then, the call processing unit 106 makes a phone call at the received telephone number "03-xxxx-xxxx" (step S102).

When the telephone terminal 300 receives the call and the user answers the call, the call processing unit 106 may output a voice such as "please leave a message." At this time, the user inputs a message by voice through the telephone terminal 300. The user may input a voice while viewing the message input page screen 400 displayed on the display processing unit 204 of the first user terminal device 200 and utter a message, following the template text displayed on the template text display area 404.

In the voice input system 100, the voice data receiving unit 108 receives voice data of the voice which the user has input through the telephone terminal 300 (step S104) and notifies the data managing unit 110. The data managing unit 110 causes the voice recognition processing unit 130 to perform the voice recognition process on the input voice data. The voice recognition processing unit 130 performs the voice recognition process (step S106). In the present embodiment, when the voice recognition processing unit 130 performs the voice recognition process, the voice input system 100 can transmit the result data of the corresponding voice recognition process to the first user terminal device 200 substantially in real time (step S110).

Figure 13:
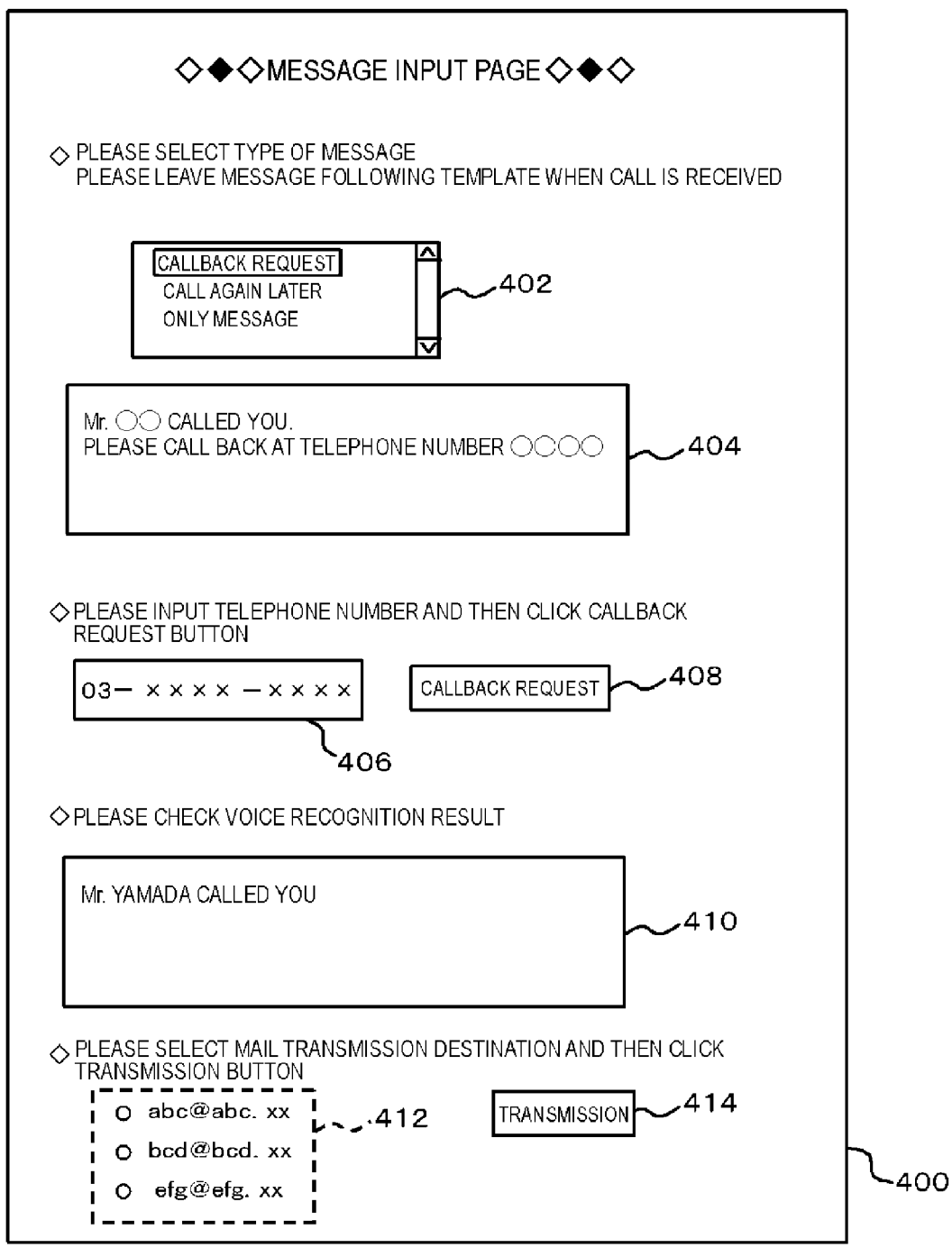
FIG. 13 is a diagram illustrating an example of a message input page screen displayed by the display processing unit of the first user terminal device.
Figure 14:
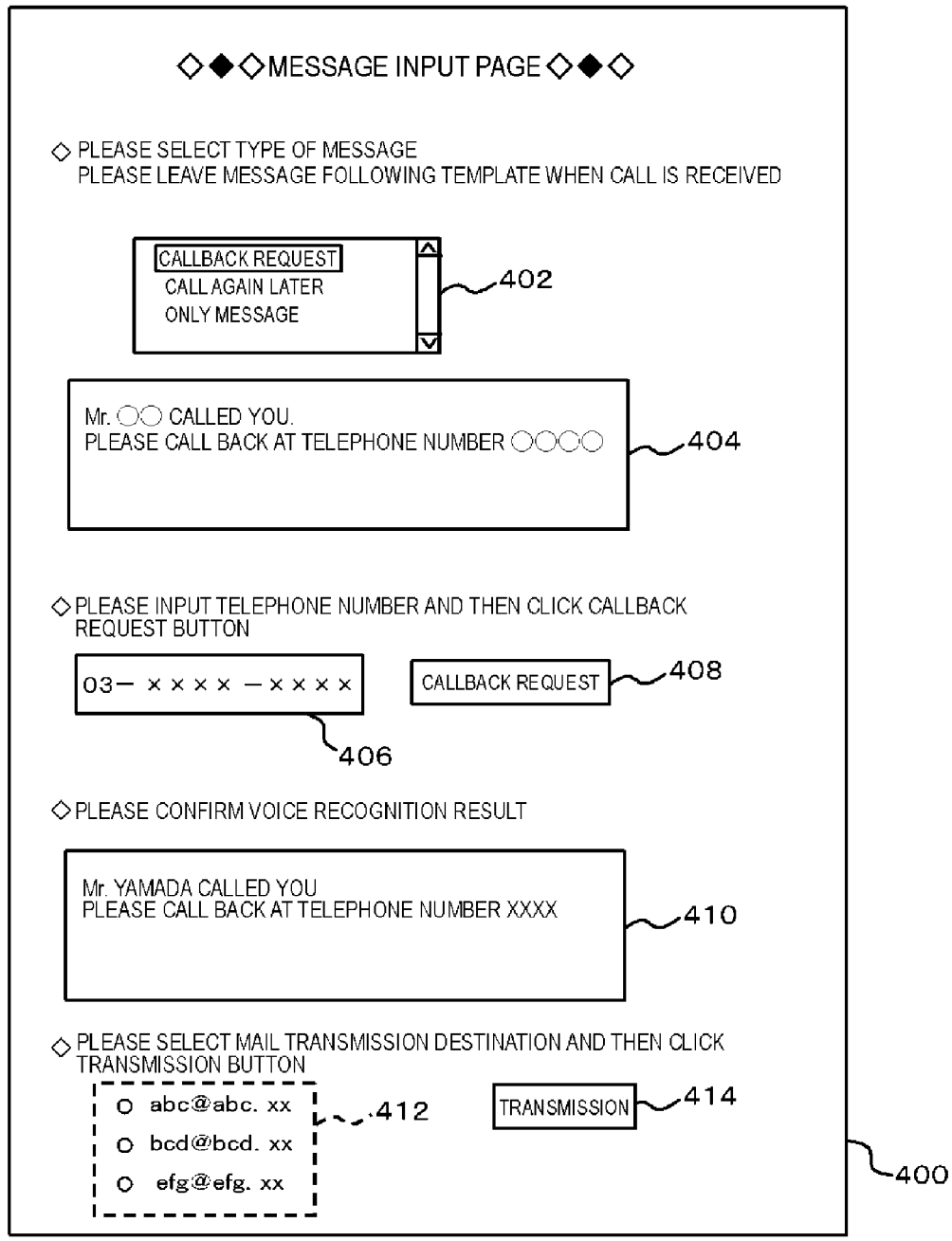
FIG. 14 is a diagram illustrating an example of a message input page screen displayed by the display processing unit of the first user terminal device.

This procedure is described with reference to FIGS. 13 and 14.

When the user inputs a voice through the telephone terminal 300, the voice input system 100 performs the voice recognition process of corresponding voice data, the result data is transmitted to the first user terminal device 200 and displayed on the voice recognition result display area 410 of the message input page screen 400. A process of specifying the first user terminal device 200 to which the result data is to be transmitted may be implemented, for example, using information associated with the telephone number and the IP address managed by the data managing unit 110. Further, the user can appropriately revise a message displayed on the voice recognition result display area 410 through the input receiving unit 202 of the voice input system 100. When the user has revised a message, the message displayed on the message display area 440 may be updated, and the result data stored in the voice recognition result storage unit 122 may be updated.

In the present embodiment, the result data of the voice recognition process is stored in the voice recognition result storage unit 122 as described in the first embodiment. Thus, the user can check the result data by designating the telephone number through any user terminal device later.

Next, still another example of the voice input system 100 in the first embodiment will be described.

The above embodiments have been described in connection with the example in which the user makes the voice recognition process request or the voice recognition result display process request through the first user terminal device 200 or the second user terminal device 210 connected with the voice input system 100 through the network 150. However, a configuration that allows the user to make the requests directly to the voice input system 100 may be provided.

Figure 16:
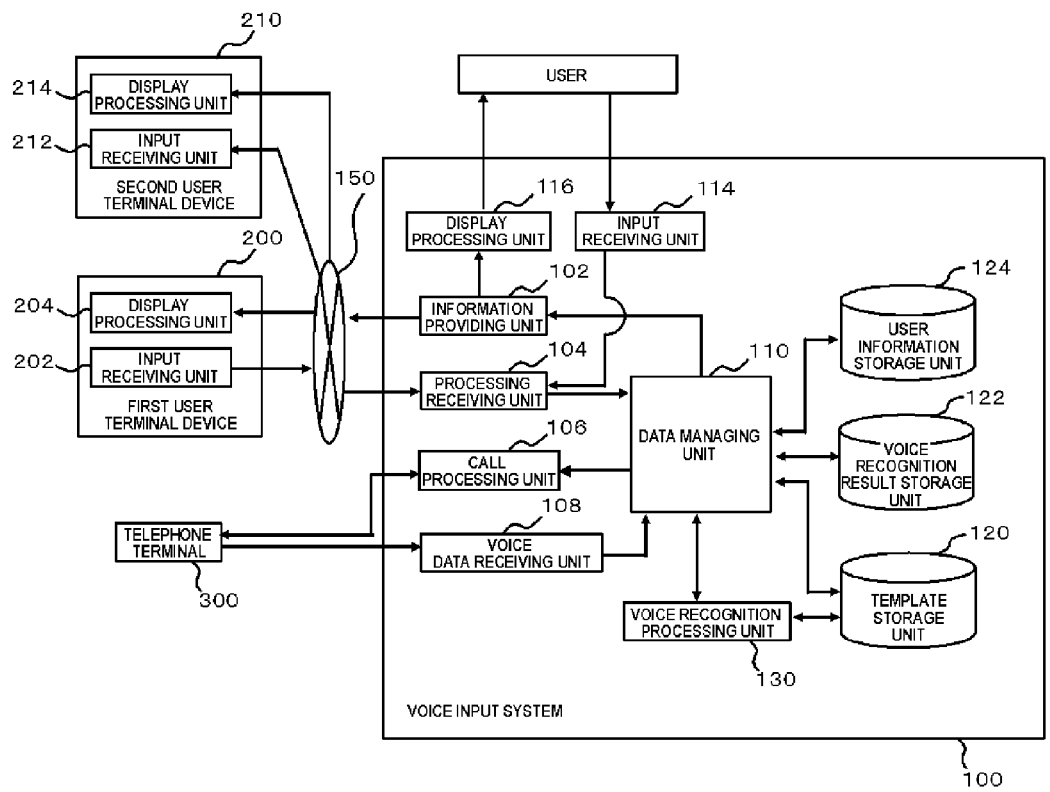
FIG. 16 is a block diagram illustrating another example of a network structure including a voice input system according to an embodiment of the present embodiment.

FIG. 16 is a block diagram illustrating another example of the voice input system 100.

The voice input system 100 further includes an input receiving unit 114 and a display processing unit 116 in addition to the configuration illustrated in FIG. 1. For example, the input receiving unit 114 includes an operating unit such as a keyboard. The processing receiving unit 104 of the voice input system 100 receives the user's instruction through the input receiving unit 114. The display processing unit 116 includes a display and a browser, and displays a web page provided from the information providing unit 102 on the display. Here, the voice input system 100 is not particularly limited and may be implemented using a robot or the like.

In this configuration, by inputting a telephone number of a desired telephone terminal, for example, the telephone number of the telephone terminal 300 through the input receiving unit 114, the user can receives a callback through the telephone terminal 300 and store the result data of the voice recognition process in association with the telephone number of the telephone terminal 300. The mail transmitting unit 112 is not illustrated in the drawing, but even in this embodiment, the voice input system 100 may be configured to include the mail transmitting unit 112.

The components of the voice input system 100, the first user terminal device 200, and the second user terminal device 210 illustrated in the drawings represent blocks of functional units rather than components of hardware units. The components of the voice input system 100, the first user terminal device 200, and the second user terminal device 210 are implemented by an arbitrary combination of hardware and software including a central processing unit (CPU) of an arbitrary computer, a memory, a program loaded in the memory to implement the components of FIG. 16, a storage unit such as a hardware disk storing the program, and a network connection interface. It would be understood by those skilled in the art that an implementation method and apparatus can be modified in various forms.

The embodiments of the present invention have been described with reference to the accompanying drawings. However, the above embodiments are exemplary, and various configurations may be employed.

The above embodiments have been described in connection with the example in which a message or the like is input by voice, and the user who desires to acquire result data of the voice recognition process of the message receives a callback by a telephone terminal such as a portable telephone terminal. However, for example, a PC may have a function of a PC software phone or a Voice over IP (VoIP) client, and the user may input message by voice using the function. In this case, the user's identification information, such as a Session Initiation Protocol (SIP) by which the user receives a callback through the PC software phone or the VoIP client may be used as the identification information of the telephone. Further, in this case, for example, the function of the telephone terminal 300 having the configuration illustrated in FIG. 1 may be provided in the first user terminal device 200.

According to the configuration of the present invention, by setting a state in which a callback is received at user's identification information of a PC software phone or a VoIP client, designating the user's identification information, and making the voice recognition process request through any terminal, the user can receive a callback at the user's identification information. Thus, when the user answers a callback and inputs a voice, the result data of the voice recognition process can be stored in association with the user's identification information. For this reason, even in this case, the user can acquire the result data of the voice recognition process by designating the user's identification information through another terminal later.

The present disclosure contains subject matter related to that disclosed in Japanese Priority Patent Application No. JP 2009-286775 filed in the Japan Patent Office on Dec. 17, 2009, the entire content of which is hereby incorporated by reference.

The invention claimed is:

1. A voice input system, comprising:
a processing request receiving unit configured to receive, from a first terminal device, identification information of a telephone that is to receive a call and a voice recognition process request;
a call originating unit configured to originate a call to the telephone based on the identification information of the telephone received by the processing request receiving unit;
a voice data receiving unit configured to receive voice data of a user's voice when the call originated by the call originating unit is received by the telephone and a message is input by the user's voice;
a voice recognition result storage unit configured to store the message, as a result data, recognized by a voice recognition process on the received voice data in association with the identification information of the telephone;
a provision request receiving unit configured to receive, from a second terminal device, a provision request for the result data, the identification information of the telephone, and identification information of the second terminal; and
an information providing unit configured to extract the corresponding result data from the voice recognition result storage unit, using the identification information of the telephone, when the provision request receiving unit receives the provision request for the result data from the second terminal device, and to provide the result data to the second terminal device based on the identification information of the second terminal device
wherein the result data is registered in the voice recognition result storage unit every time the voice data receiving unit receives voice data of the user's voice.

2. The voice input system according to claim 1, wherein the identification information of the second terminal device comprises an IP address of the second terminal device.

3. The voice input system according to claim 1, wherein the processing request receiving unit is further configured to receive, from the first terminal device, the identification information of the telephone and the voice recognition process request through a network.

4. The voice input system according to claim 3, wherein the processing request receiving unit is further configured to receive, from the first terminal device, identification information of the first terminal device together with the voice recognition process request and the identification information of the telephone, through the network, and
the information providing unit is further configured to provide, to the first terminal device, the result data based on the identification information of the first terminal device.

5. The voice input system according to claim 4, wherein the identification information of the first terminal device comprises an IP address of the first terminal device.

6. The voice input system according to claim 1, wherein the identification information of the telephone comprises a telephone number of a telephone terminal.

7. The voice input system according to claim 1, wherein the processing request receiving unit is further configured to provide a web page including an input box for the identification information of the telephone and to receive the identification information of the telephone input to the input box.

8. The voice input system according to claim 7, wherein the processing request receiving unit is further configured to display, on the web page including the input box, a template text of a message for a user to recite on the telephone.

9. The voice input system according to claim 8, further comprising:
a template storage unit configured to store, in association with the template text, feature data corresponding to the content of the template text and to provide the feature data to a voice recognition processing unit.

10. The voice input system according to claim 1, further comprising
a mail transmitting unit configured to receive, from a user, a mail address designated as a transmission destination for the result data and to transmit the result data to the mail address.

11. The voice input system according to claim 1, wherein the result data comprises a text data of words included in the voice data received by the voice data receiving unit.

12. A non-transitory information storage medium storing a voice input program causing a computer to function as:
a processing request receiving unit configured to receive, from a first terminal device, identification information of a telephone that is to receive a call and a voice recognition process request;
a call originating unit configured to originate a call to the telephone based on the identification information of the telephone received by the processing request receiving unit;
a voice data receiving unit configured to receive voice data of a user's voice when the call originated by the call originating unit is received by the telephone and a message is input by the user's voice;
a voice recognition result storage unit configured to store the message, as a result data, recognized by a voice recognition process on the received voice data in association with the identification information of the telephone;
a provision request receiving unit configured to receive, from a second terminal device, a provision request for the result data, the identification information of the telephone, and identification information of the second terminal; and
an information providing unit configured to extract the corresponding result data from the voice recognition result storage unit, using the identification information of the telephone, when the provision request receiving unit receives the provision request for the result data from the second terminal device, and to provide the result data to the second terminal device based on the identification information of the second terminal device wherein the result data is registered in the voice recognition result storage unit every time the voice data receiving unit receives voice data of the user's voice.

13. The non-transitory information storage medium according to claim 12, wherein the result data comprises a text data of words included in the voice data received by the voice data receiving unit.

* * * * *